(12) United States Patent
Flynn

(10) Patent No.: US 6,553,570 B1
(45) Date of Patent: Apr. 29, 2003

(54) CAP WITH SPECTACLES

(76) Inventor: Darcy Lester Flynn, 116 River Park Dr., Annandale Townsville QLD 4814 (AU)

( * ) Notice: Subject to any disclaimer, the term of this patent is extended or adjusted under 35 U.S.C. 154(b) by 0 days.

(21) Appl. No.: 09/856,197

(22) PCT Filed: Nov. 18, 1999

(86) PCT No.: PCT/AU99/01022

§ 371 (c)(1), (2), (4) Date: May 17, 2001

(87) PCT Pub. No.: WO00/28848

PCT Pub. Date: May 25, 2000

(30) Foreign Application Priority Data

Nov. 18, 1998 (AU) .................................... PP7173

(51) Int. Cl.[7] .................................................. A61F 9/00
(52) U.S. Cl. .......................................... 2/10; 2/209.13
(58) Field of Search ..................... 2/209.13, 175.1, 2/195.1, 10, 12; 351/155, 43

(56) References Cited

U.S. PATENT DOCUMENTS

| | | | | |
|---|---|---|---|---|
| 5,129,102 A | * | 7/1992 | Solo | 2/10 |
| 5,347,655 A | | 9/1994 | Garrett | |
| 5,412,812 A | * | 5/1995 | Gatchalian | 2/10 |
| 5,533,207 A | * | 7/1996 | Diaz | 2/10 |
| 5,689,827 A | * | 11/1997 | Ryder | 2/10 |
| 5,778,448 A | | 7/1998 | Maher | |
| 5,987,640 A | * | 11/1999 | Ryder | 2/10 |
| 6,275,992 B1 | * | 8/2001 | Bondy | 2/10 |

* cited by examiner

Primary Examiner—John J. Calvert
Assistant Examiner—Katherine Moran
(74) Attorney, Agent, or Firm—Hudak, Shunk & Farine, Co. LPA

(57) ABSTRACT

A cap (10, 110) has spectacles (20, 120) which can extend down from, or be retracted to be against the underside of, the peak (12, 112). Arms (23, 123) on the spectacles (20, 120), are hingedly mounted on mounting blocks (25, 125) and complementary teeth (37, 33/137, 133) allows the spectacles (20, 120) to be positioned at a range of different positions relative to the peak (12, 112).

14 Claims, 6 Drawing Sheets

CAP WITH SPECTACLES

BACKGROUND OF THE INVENTION

1. Field of the Invention

THIS INVENTION relates to a cap with spectacles.

The term "cap" shall be used throughout the specification to include cap, hat, helmet, shade, visor or the like head covering or eye shade apparatus.

The term "spectacles" shall be used to include sunglasses, safety glasses, magnifying glasses, prescription glasses and the like.

2. Prior Art

The provision of sunglasses on a cap is known and examples are sold under the Registered Trade Mark "CAP-SEYES" owned by Suncap Australia Pty Ltd. These caps are disclosed in (lapsed) Au-A-72859/94 and AU-A-20625/95 in the name of Mark Toovey.

With those caps, the sunglasses fold up into the interior of the cap. This can make the cap uncomfortable to wear, and the transfer of oils or the like from the wearer's hair to the sunglasses means they must be cleaned each time they are to be used.

SUMMARY OF THE INVENTION

It is an object of the present invention to provide cap for spectacles where the spectacles are pivotally mounted on the peak of the cap. (The term "peak" shall include the brim of a hat, visor, shade or helmet.)

It is a preferred object, when not in use, that the spectacles be under the cap peak.

It is a further preferred object that spectacles with a range of lens types can be provided on the cap.

Other preferred objects will become apparent from the following description.

OBJECTS OF THE INVENTION

In one aspect the present invention resides in a cap of the type having a head-covering portion and a peak including:
   at least one mounting assembly on an underside of the peak; and
   spectacles, having at least one lens assembly, having a pair of arms hingedly mounted on the or each mounting assembly and movable between a first position extending operatively down below the peak and a second position underlying the peak.

Preferably the arms extend rearwardly from the or each lens assembly and are inwardly inclined in plan view; and
   at distal ends of the arms, first teeth-like formations engage complementary teeth-like formations on the or each mounting assembly.

Preferably, the spectacles incorporate a frame at least partially surrounding the or each lens assembly, and the arms extend from respective ends of the frame.

Alternatively, the spectacles have a frame and lenses as a single unit, and the arms extend from the respective ends thereof.

In one embodiment, the mounting assembly has a mounting block integral with, or secured to the peak, with a respective hole at each end, surrounded by the teeth-like formations; and
   the distal end of each arm has a pin, surrounded by the first teeth-like formations, operably engageable in a respective one of the holes in the mounting block.

In an alternative embodiment, a pair of mounting assemblies are provided at spaced locations on the peak; and
   each mounting assembly has a mounting bracket with a base portion fixed to the peak and a leg portion to which the distal end of a respective arm is hingedly mounted.

Preferably the base portion is located on, and secured to, a mounting block integral with, or secured to, the underside of the peak.

Preferably, each leg portion has a distal end provided with the complementary tooth-like formations; and
   the distal end of each arm has a recess to receive the distal end of a leg portion and which is provided with the first tooth-like formations.

Alternatively, the distal end of each leg portion is provided with the recess to receive the distal end of an arm, the recess being provided with the first tooth-like formations, and the distal end of each arm is provided with the complementary tooth-like formations.

Preferably, a fastener hingedly connects the distal end of the arm to the distal end of the leg portion; and
   the first tooth-like formations include an abutment finger to engage a side of the leg portion when the spectacles are in the first position.

In a second aspect, the present invention resides in:
   spectacles for a cap of the type having a head-covering portion and peak, the peak having at least one mounting assembly on the underside thereof, the spectacles including:
   at least one lens assembly, and
   a pair of arms hingedly mountable on the or each mounting assembly and movable between a first position where the or each lens assembly extends operatively down below the peak and a second position where the, or each lens assembly underlies the peak.

Preferably, the mounting arrangement allows flex in the mounting assembly and/or spectacles, etc, especially in safety hats, helmets, etc, to stop nose injury when the safety hard hat, helmet, etc, is impacted from above.

Preferably, the spectacles of the first embodiment are manufactured so the pivoting pins are of a selected length, so as to allow the spectacles to unclip out of the hinging mechanism when any force is applied to the top of the safety hard hat or the peak of the cap, so as to limit any injury to the individual's nose.

Preferably, a flexing mechanism is designed, as an alternative, to "cushion" any impact damage from above, on the nose of the wearer. This can be achieved by having an "O" ring, etc, around a split, or bi-sected mounting, to gain the required flexing and cushioning protection. Another alternative is to have spectacles which flex, particularly across the bridge of the nose, eg, of "memory plastic" or similar.

Preferably, the shape of the spectacles is basically of the same radius of curvature as the front of the cap which, in turn, corresponds with the radius in the cap peak. This allows the spectacles to pivot and fit into the said radius and, therefore, not be easily visible when not in use.

In a working environment where safety glasses, etc, are required, the safety glasses may be attached to a safety hard hat, military helmet, police hats, or a cap (for hair safety around machinery, etc), and when the safety glasses are required, they are basically extended down into place. If sunglasses are required, these can be folded down in front of the safety glasses.

A new style of safety hat, safety cap (hair), safety hard hat, light duty plastic, eg, type safety cap/hat, could be developed for many work, military, lawn moving and snipping, handyman, night driving cap/glasses, magnifying glasses/cap, etc, which have the advantage of always having the required type of spectacles ready and attached to the cap, hat, helmet, visor, etc.

The different types of spectacles could be made interchangeable to allow individuals to set up for specific purposes, or the spectacles could be provided with interchangeable lenses.

The peaks of the caps can have numerous shapes, eg, some caps have a curved peak (eg, baseball cap), standard flat peak, some have peaks facing slightly upwards, etc. All these shapes can be suited to the pivoting, folding, spectacles.

Another feature of the cap can be a "Velcro" style flap, or separate piece of matching cap material, which could be attached to the head covering portion, once the cap size has been adjusted, to cover the "hole" in the back of most caps which usually allows a "tuft" of hair to protrude. Any wearer wanting to leave some long hair protruding through the rear of the cap, could remove the "Velcro" style matching cover.

Preferably, the width of the spectacles on a cap will be similar to the width of the peak of the cap to produce virtually hidden spectacles when not in use.

BRIEF DESCRIPTION OF THE DRAWINGS

To enable the invention to be fully understood, preferred embodiments will now be described with reference to the accompanying drawings, in which.

DETAILED DESCRIPTION OF THE PREFERRED EMBODIMENTS

Figure 1:
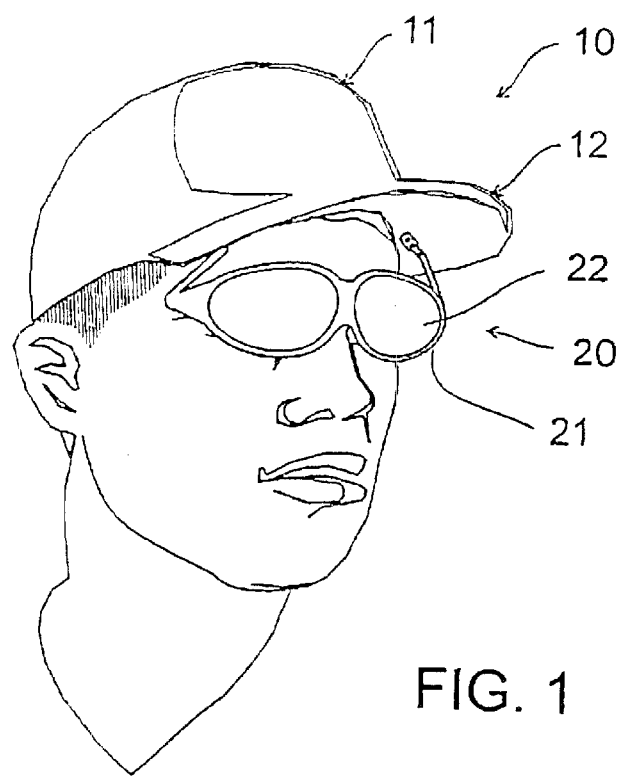
FIG. 1 is a first perspective view of a first embodiment of a baseball-type cap, with the spectacles in the operative position.
Figure 2:
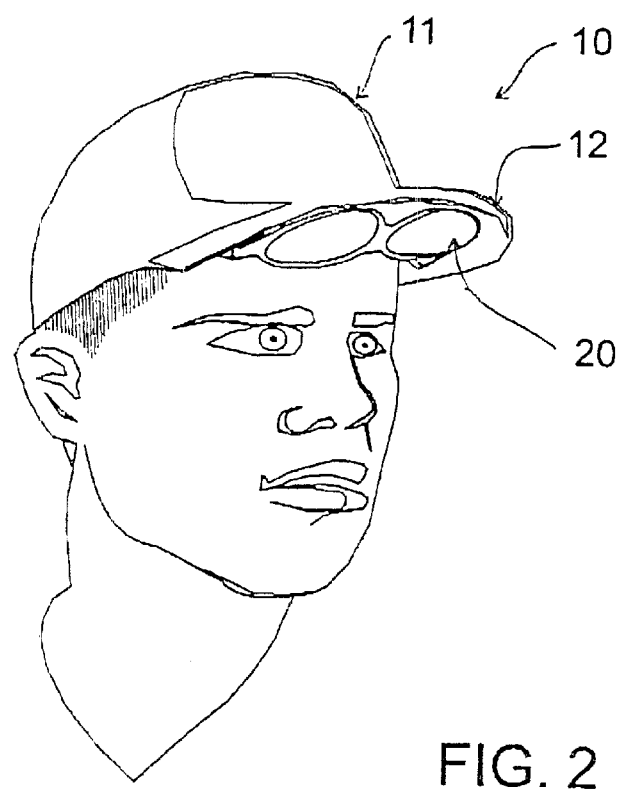
FIG. 2 is a similar view with the spectacles in the inoperative position.
Figure 3:
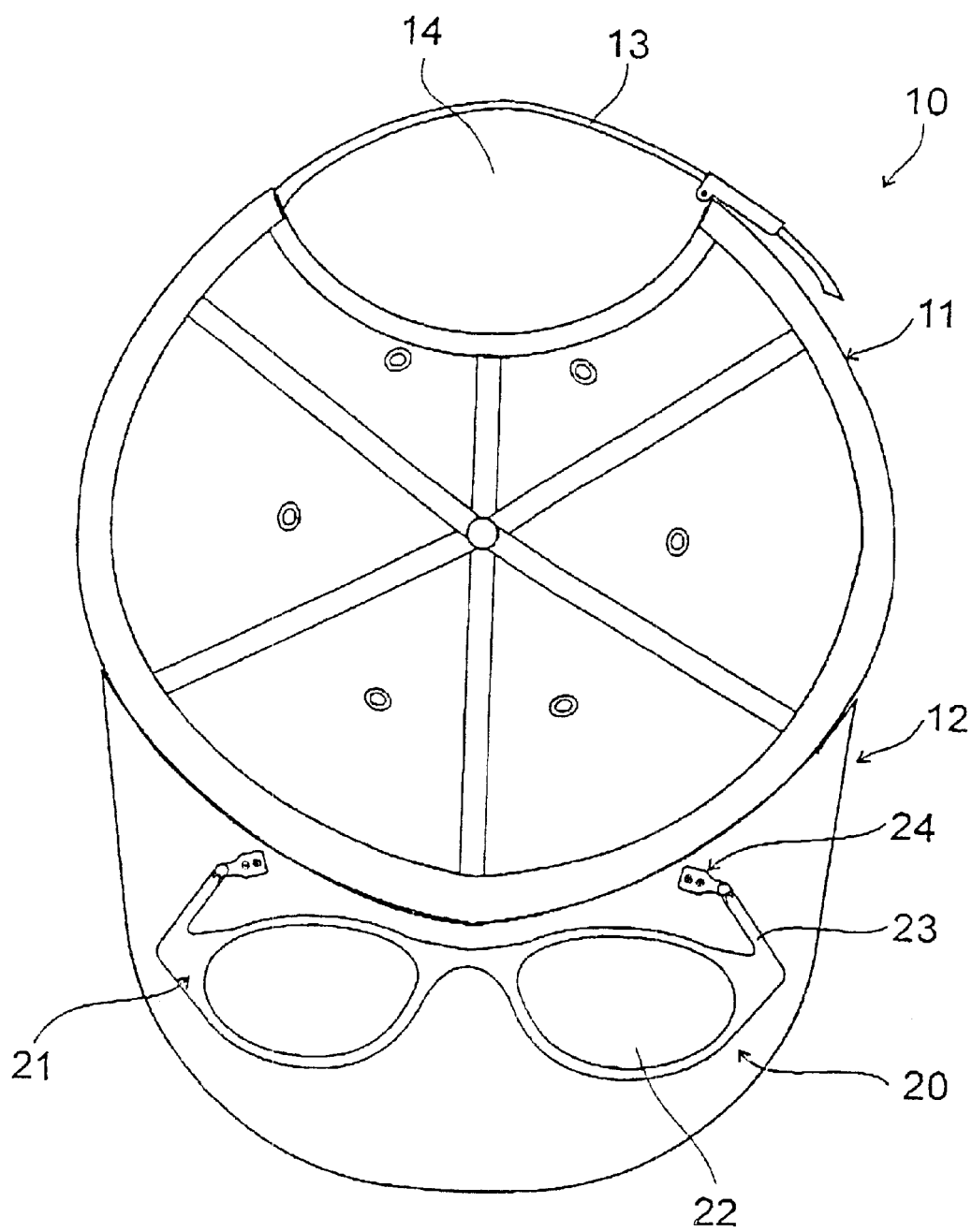
FIG. 3 is a bottom plan view corresponding to FIG. 2.

Referring to FIGS. 1 to 3, the cap 10 has a domed head-covering portion 11 with a semi-rigid peak 12 in the baseball-cap style. An adjustment strap 13 allows the cap 10 to be worn by persons with different head sizes; and a hole 14 at the rear of the cap 10 allows a person's hair eg, ponytail, to extend from the cap.

The spectacles (eg, sunglasses) 20, to be hereinafter described, are hingedly mounted on the underside of the peak 12 and are selectively movable between (a) the extended, operative, position in FIG. 1 (in front of the person's eyes), and (b) the retracted, inoperative, position in FIG. 2, lying beneath the peak 12.

The spectacles 20 have a frame 21 which mounts a pair of lenses 22. The lenses 22 may be prescription lenses, sunglass lenses, safety lenses, coloured (eg, blue or yellow) for day or night sports and may come in a wide range of shapes.

The spectacles 20 have a respective arm 23 at each end of the frame 21 (and moulded integrally therewith), and each arm 23 is hingedly connected to a mounting assembly 24, fixed to the underside of the peak, to be hereinafter described in more detail.

Figure 4:
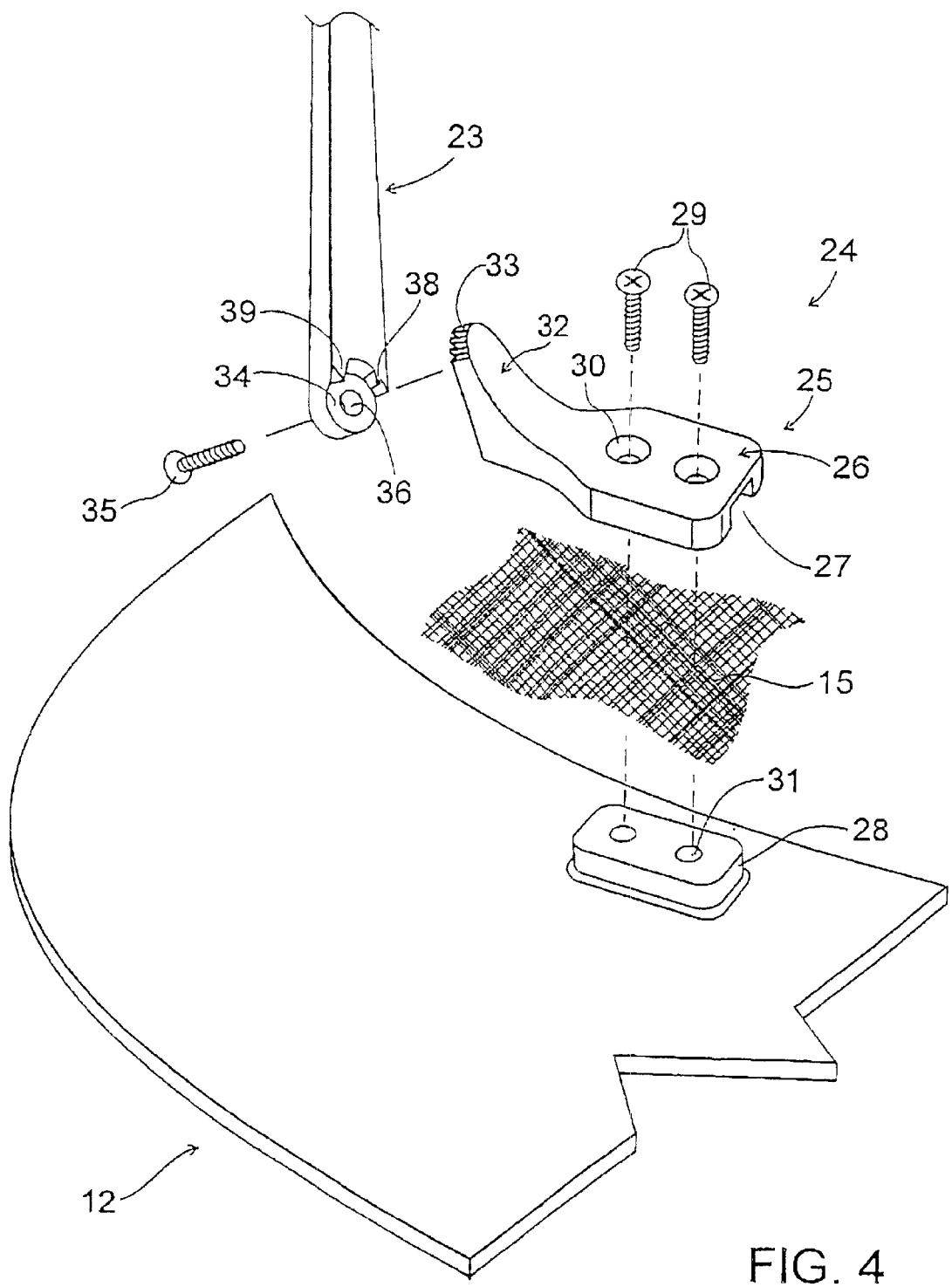
FIG. 4 is an enlarged exploded perspective view of the mounting of one of the arms of the spectacles.
Figure 5:
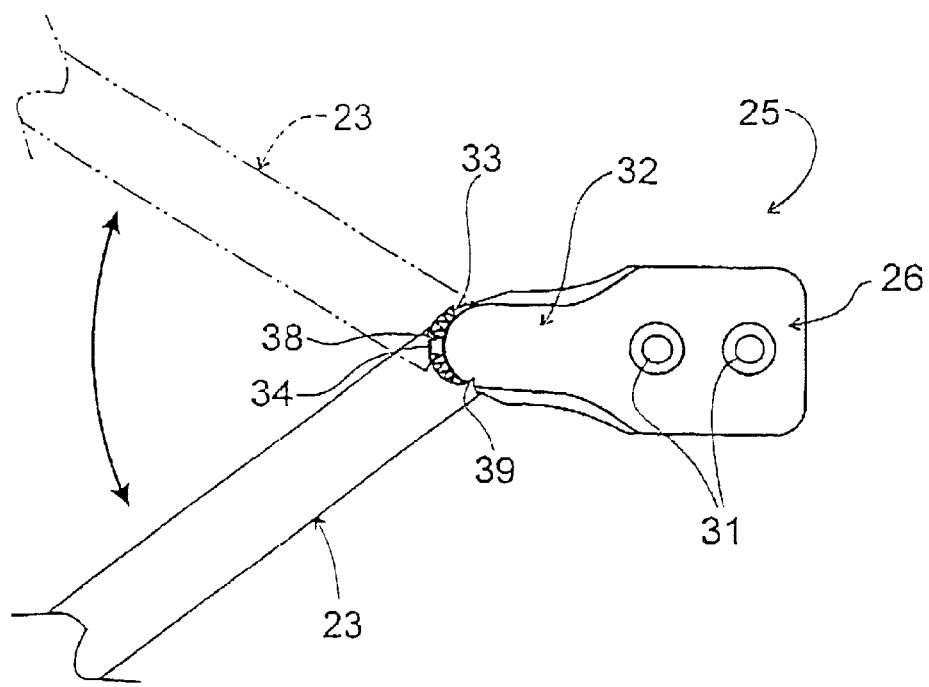
FIGS. 5 & 6 are respective bottom plan and side elevational views corresponding to FIG. 4.
Figure 6:
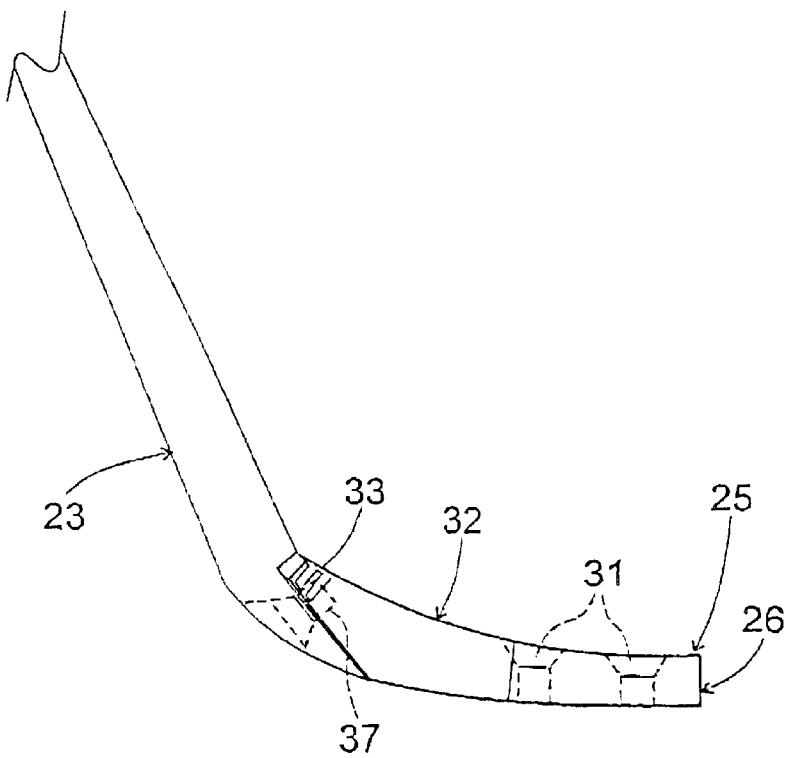

Referring to FIGS. 4 to 6, each mounting assembly 24 has a mounting bracket 25 of substantially L-shape in side view. A base portion 26 has an elongate slot or recess 27 in its underside and is dimensioned to enable the base portion 26 to be located over, and secured to, a mounting block 28 integral with, or fixed (eg, glued to), the peak12. The base portion 26 is fixed to the mounting block 28 via screws 29 received in respective pairs of aligned holes 30, 31 in the base portion 26 and mounting block 28, respectively. N.B. The fabric covering 15 for the peak 12 is clamped between the base portion 26 and mounting block 28 to conceal the latter.

The leg portion 32 of the mounting bracket 25 has a plurality of teeth 33 (eg, of saw-tooth configuration) at its distal end.

The respective arm 23 has a recess 34 at its distal end, dimensional to receive the distal end of the leg portion 32. A screw 35 passes through a hole 36 in the arm 23 and is received in an aligned hole 37 in the leg portion 32, to hingedly connect the arm 23 to the leg portion 32.

At least one tooth 38 in the recess 34 is operably engageable with the teeth 33 on the leg portion 32 to allow the arm 23 to be releasably "locked" at a range of angular positions relative to the leg portion 32. An abutment finger 39 at one end of the recess 34 is adapted to engage the side of the leg portion 32, as a support or brace, when the spectacles 20 are within the operative position (of FIG. 1).

As the spectacles 20 are moved from the operative position of FIG. 1 to the inoperative position of FIG. 2, the arms 23 hinge about the screws 35 until the frame 21 (and lenses 22) and arms 23 underlie the peak 12. The teeth 38 on the respective arms 23 engage the teeth 33 on the mounting brackets 25 to retain the spectacles 20 in that position.

When the spectacles are moved to the operative position of FIG. 1, the engagement of the teeth 33,38 enable the spectacles 20 to set at a range of angles relative to the peak12, with the abutment fingers 39 on the arms 23 engaging the leg portions 32 of the mounting brackets at the "full-down" operative position.

Figure 7:
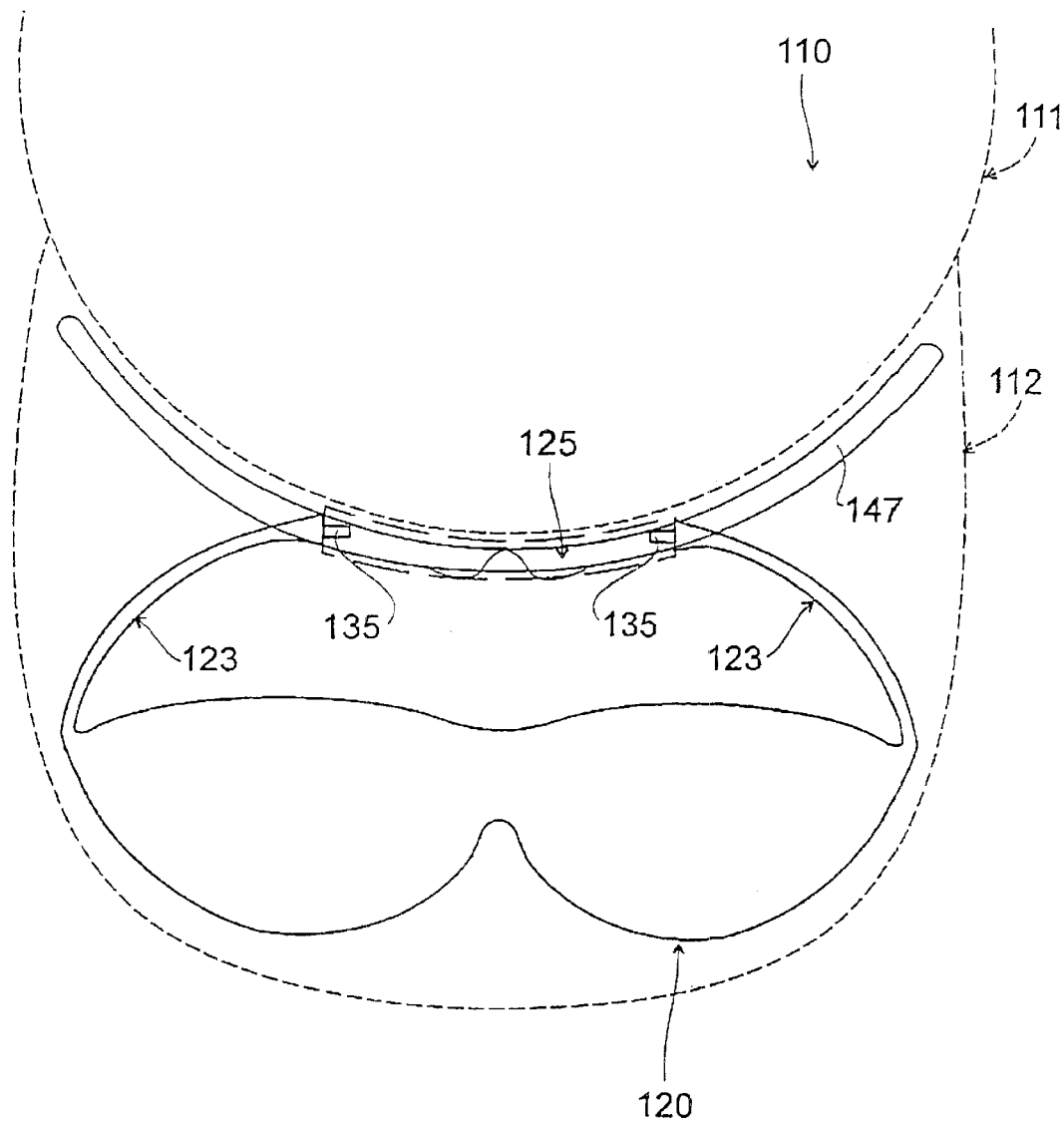
FIG. 7 is a plan view of a second embodiment of the baseball-type cap, with the spectacles (folded) in the inoperative position.
Figure 8:
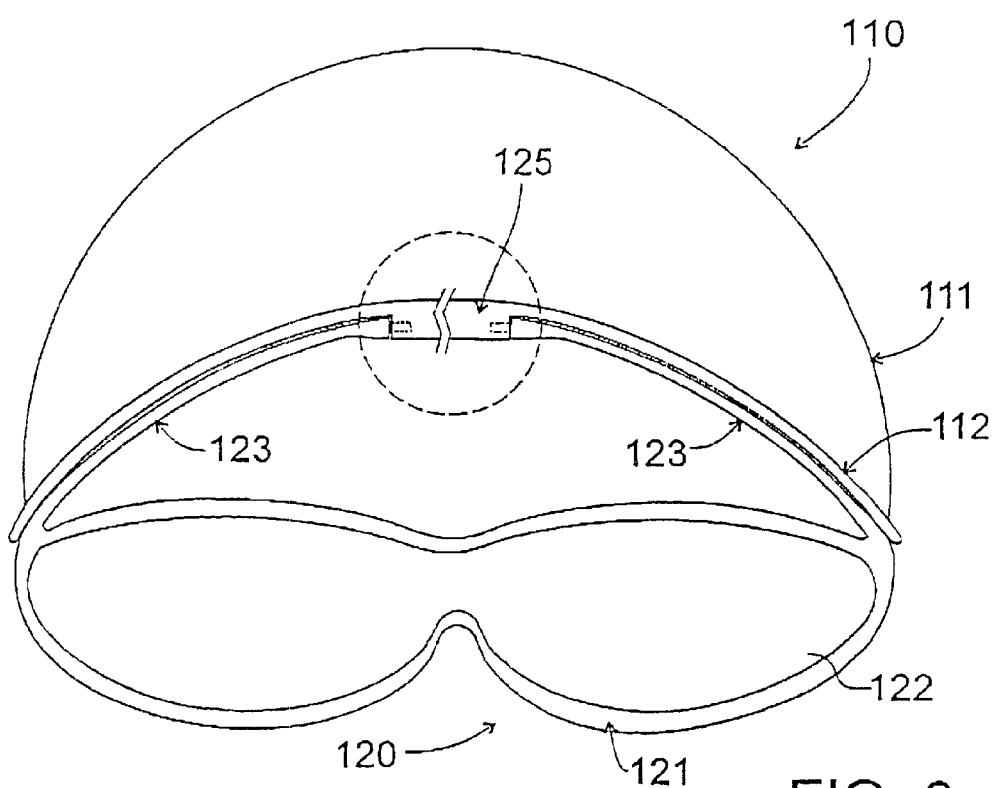
FIG. 8 is a front view, showing the cap with the spectacles in the operative position.
Figure 9:
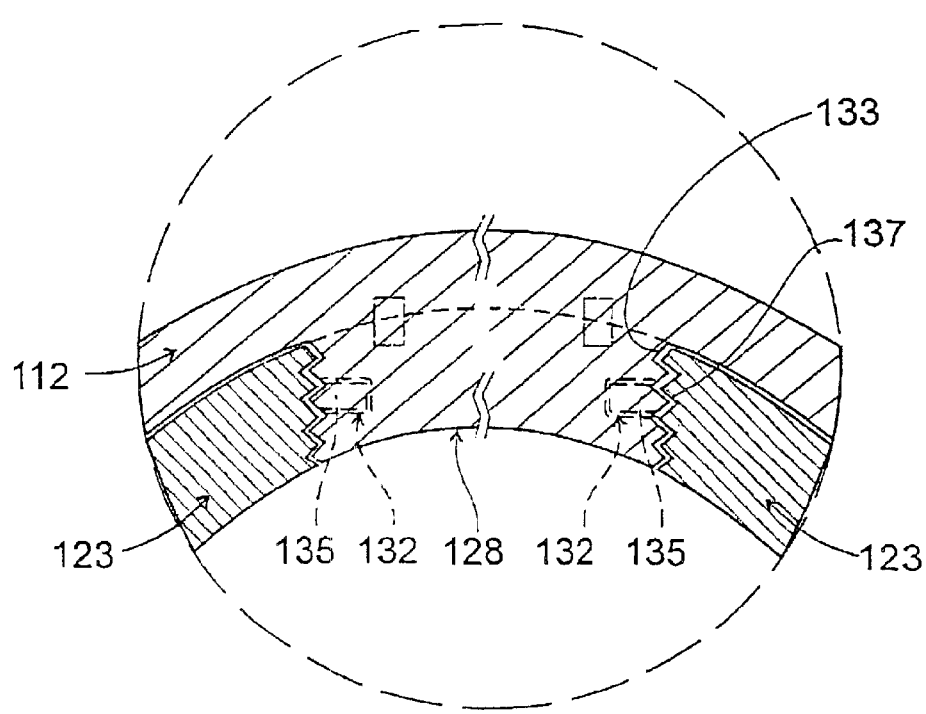
FIG. 9 is an enlarged view of the hinged mounting mechanism for the spectacles.

Referring to the second embodiment of FIGS. 7 to 9, the cap 110 has a domed head-covering portion 111 with a peak 112 in the baseball-cap style. An adjustment strap (not shown) allows the cap 110 to be worn by persons with different head sizes, as hereinbefore described.

The spectacles 120, to be hereinafter described, are hingedly mounted on the underside of the peak 112 and are selectively movable between the extended, operative position shown in FIG. 7 and the retracted, inoperative position shown in FIG. 8.

The spectacles 120 have a pair of arms 123, each with a respective hinge pin 135. The pins 135 are engageable in aligned pairs of holes 132 in a mounting block 125 under the peak 112, and the tooth-like formations 138 about the pins 125 are engageable with complementary teeth-like formations 133 about the holes 132 to enable the rotational relationship between the spectacles 120 and peak 112 to be adjustably set.

The mounting block 125 can be mounted on, or formed integrally with, a support member 147 fixed to the underside of the peak 112.

The complementary formations 138,133 allow the spectacles 120 to be supported in a range of alternative operative positions eg, to suit different wearers' requirements.

The arms 123 may be formed as components of a frame 121 for the lens/lenses, or be formed integrally with the lens/lenses 122 of the spectacles 120.

As hereinbefore described, the present invention may be applied to spectacles where the frame/lens(es) are formed as an integral unit (eg., in polycarbonate material). The invention can also be applied to spectacles with metal/wire/frames and arms.

The spectacles 20,120 can also be fitted to a safety helmet (not shown) where an outer shell of impact-resistant plastic has internal foam-rubber absorbing pads and may have a flexible or expanding rear section.

As hereinbefore described, different types of lenses 22,122 can be fitted to the spectacles 20, 120.

Various changes and modifications may be made to the embodiments described and illustrated without departing from the present invention.

What is claimed is:

1. A cap of the type having a head-covering portion and a peak including:
   at least one mounting assembly on an underside of the peak; and
   spectacles, having at least one lens assembly, having a pair of arms hingedly mounted on the or each mounting assembly and moveable between a first position extending operatively down below the peak and a second position underlying the peak, wherein the arms extend rearwardly from the or each lens assembly and are inwardly inclined in plan view; and wherein at distal ends of the arms, first teeth-like formations engage complementary teeth-like formations on the or each mounting assembly.

2. A cap as claimed in claim 1 wherein:
   the spectacles incorporate a frame at least partially surrounding the or each lens assembly, and the arms extend from respective ends of the frame.

3. A cap as claimed in claim 2 wherein:
   the mounting assembly has a mounting block integral with, or secured to the peak, with a respective hole at each end, surrounded by the complementary teeth-like formations; and
   the distal end of each arm has a pin, surrounded by the first teeth-like formations, operably engageable in a respective one of the holes in the mounting block.

4. A cap as claimed in claim 1 wherein:
   a pair of mounting assemblies are provided at spaced locations on the peak; and
   each mounting assembly has a mounting bracket with a base portion fixed to the peak and a leg portion to which the distal end of a respective arm is hingedly mounted.

5. A cap as claimed in claim 4 wherein:
   the base portion is located on, and secured to, a mounting block integral with, or secured to, the underside of the peak.

6. A cap as claimed in claim 1 wherein:
   each leg portion has a distal end provided with the complementary tooth-like formations; and
   the distal end of each arm has a recess to receive the distal end of the leg portion and which is provided with the first tooth-like formations.

7. A cap as claimed in claim 1 wherein:
   a faster hingedly connects the distal end of the arm to the distal end of the leg portion; and
   the first tooth-like formations include an abutment finger to engage a side of the leg portion when the spectacles are in the first position.

8. Spectacles as claimed in claim 1 wherein:
   a frame at least partially surrounds the or each lens assembly, and the arms extend from respective ends of the frame.

9. Spectacles as claimed in claim 8 wherein:
   the mounting assembly on the peak has a mounting block integral with, or secured to the peak with a respective hole at each end, surrounded by the complementary teeth-like formations; and
   the distal end of each arm has a pin,
   surrounded by the first teeth-like formations, operably engageable in a respective one of the holes in the mounting block.

10. Spectacles for a cap of the type having a head-covering portion and peak, the peak having at least one mounting assembly on the underside thereof, the spectacles including:
    at least one lens assembly, and
    a pair of arms hingedly mountable on the or each mounting assembly and movable between a first position where the or each lens assembly extends operatively down below the peak and a second position where the or each lens assembly underlies the peak, wherein the arms extend rearwardly from the or each lens assembly and are inwardly inclined in plan view, and wherein at distal ends of the arms, first teeth-like formations are engageable with complementary teeth-like formations on the or each mounting assembly on the peak.

11. Spectacles as claimed in claim 10 wherein:
    a pair of mounting assemblies are provided at spaced locations on the peak; and
    each mounting assembly has a mounting bracket with a base portion fixed to the peak and a leg portion to which the distal end of a respective arm is hingedly mounted.

12. Spectacles as claimed in claim 11 wherein:
    the base portion is located on, and secured to, a mounting block integral with, or secured to, the underside of the peak.

13. Spectacles as claimed in claim 11 wherein:
    each leg portion has a distal end provided with the complementary tooth-like formations; and
    the distal end of each arm has a recess to receive the distal end of a leg portion and which is provided with the first tooth-like formations.

14. Spectacles as claimed in claim 13 wherein:
    a fastener hingedly connects the distal end of the arm to the distal end of the leg portion; and
    the first tooth-like formation includes an abutment finger to engage a side of the leg portion when the spectacles are in the first position.

* * * * *